(12) United States Patent
Shima et al.

(10) Patent No.: US 8,915,606 B2
(45) Date of Patent: Dec. 23, 2014

(54) DISPLAY DEVICE

(71) Applicant: Sony Corporation, Tokyo (JP)

(72) Inventors: Kotaro Shima, Kanagawa (JP); Hiroaki Matsui, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 13/923,621

(22) Filed: Jun. 21, 2013

(65) Prior Publication Data

US 2014/0009909 A1 Jan. 9, 2014

(30) Foreign Application Priority Data

Jul. 4, 2012 (JP) ................................. 2012-150500

(51) Int. Cl.
| | |
|---|---|
| *G09F 13/08* | (2006.01) |
| *G02F 1/13357* | (2006.01) |
| *F21V 33/00* | (2006.01) |
| *G09F 13/22* | (2006.01) |

(52) U.S. Cl.
CPC ....... *F21V 33/0052* (2013.01); *G09F 2013/222* (2013.01); *G09F 13/22* (2013.01); *G09F 13/08* (2013.01)
USPC .............. 362/97.1; 362/97.3; 349/58; 349/64

(58) Field of Classification Search
CPC .................... G02F 1/133602; G02F 1/133606; G02F 1/133608
USPC .............................. 362/97.1–97.4; 349/58, 64
See application file for complete search history.

(56) References Cited

U.S. PATENT DOCUMENTS

| | | | |
|---|---|---|---|
| 2008/0030648 A1* | 2/2008 | Morita et al. | 349/64 |
| 2012/0063133 A1 | 3/2012 | Takeuchi et al. | |
| 2012/0087122 A1 | 4/2012 | Takeuchi et al. | |
| 2012/0087126 A1 | 4/2012 | Takeuchi et al. | |
| 2012/0105763 A1 | 5/2012 | Takeuchi et al. | |
| 2013/0194529 A1* | 8/2013 | Chang et al. | 362/97.1 |
| 2013/0201663 A1* | 8/2013 | Cho et al. | 362/97.2 |
| 2014/0211123 A1* | 7/2014 | Lee et al. | 349/64 |

FOREIGN PATENT DOCUMENTS

| | | | |
|---|---|---|---|
| JP | 2010218915 A | * | 9/2010 |
| JP | 2011-034956 A | | 2/2011 |

* cited by examiner

*Primary Examiner* — Mariceli Santiago
(74) *Attorney, Agent, or Firm* — Lerner, David, Littenberg, Krumholz & Mentlik, LLP (57) ABSTRACT

A display device includes: a display of which a display surface is displayed with an image; plural light sources which output light toward the display, and configure a backlight; a diffuser plate arranged between the display and the plural light sources, and diffuses light output from the light source; and a support pin arranged on the opposite side to the display by interposing the diffuser plate therebetween, and holds the diffuser plate by being in contact with the diffuser plate. A plate shaped unit formed in a transparent plate shape is provided at a portion located on the diffuser plate side in the support pin, the plural light sources and the support pin are arranged in line in a direction orthogonal to a direction in which the display and the diffuser plate are aligned, and the plate shaped unit is caused to face the light source in the shortest distance.

6 Claims, 6 Drawing Sheets

DISPLAY DEVICE

CROSS-REFERENCE TO RELATED APPLICATION

The present application claims priority from Japanese Patent Application No. JP 2012-150500 filed in the Japanese Patent Office on Jul. 4, 2012, the entire content of which is incorporated herein by reference.

BACKGROUND

The present technology relates to a field of technology relating to a display device. More specifically, the present technology relates to a field of technology in which an occurrence of uneven brightness on a display is suppressed by suppressing an occurrence of a shadow on a diffuser plate by providing a plate shaped unit which is formed in a transparent plate shape at a support pin holding the diffuser plate, and causing the plate shaped unit to face a light source which is in the shortest distance.

In a display device such as a television receiver, or a personal computer, a display which has a display surface on which an image is displayed, a light source which outputs light toward the display and configures a backlight, and a diffuser plate which diffuses light which is output from the light source, are provided.

In such a display device, light which is output is diffused by the diffuser plate, and input to a display. Since the light which is diffused by the diffuser plate is input to the display, an occurrence of uneven brightness on the display is suppressed.

In the above described display device, a plurality of support pins which hold the diffuser plate are arranged on the rear side of the diffuser plate (for example, refer to Japanese Unexamined Patent Application Publication No. 2011-34956).

The support pin is attached to a back chassis or the like which is arranged on the rear side of the diffuser plate, and of which the tip end is able to be in contact with the rear surface of the diffuser plate. An optical distance from a light source to the diffuser plate is constantly maintained when deformation of the diffuser plate (bending) is suppressed, and the diffuser plate is held by the support pin, accordingly, it is possible to secure a good optical performance.

In addition, when the deformation of the diffuser plate is suppressed, and vibration in the front-back direction thereof is suppressed by the support pin, it is also possible to prevent an optical sheet which is located at the front side of the diffuser plate, or the display from being damaged.

SUMMARY

However, in a display device in which a support pin is provided which is disclosed in Japanese Unexamined Patent Application Publication No. 2011-34956, since the support pin is present in the same space as a light source on the rear side of a diffuser plate, light which is output from the light source is shut out by the support pin. When the light is shut out by the support pin, a shadow of the support pin is generated on the diffuser plate, and there is a concern that brightness of a display may partially decrease, and uneven brightness may occur.

In particular, when a light source with high directivity such as a light emitting diode (LED) is used, a shadow due to a presence of the support pin on the diffuser plate easily occurs by the high directivity of the light source.

In addition, in recent years, there is a tendency of increasing in light amount which is output from a light source such as one light emitting diode or the like, accordingly, the number of light sources is decreased to that extent, and when the number of light sources is decreased, a difference in brightness in each portion of a display easily occurs, accordingly, uneven brightness further easily occurs.

Therefore, in the related art, there is a display device which is configured such that a support pin is formed using a transparent material, and light transmits the support pin.

However, even in a case where the support pin is formed using a transparent material, a portion at which the outer peripheral portion of the support pin is projected on the diffuser plate when light is input to the support pin becomes a dark portion at which brightness is slightly low compared to other portions. At this time, there is a concern that uneven brightness in the display may be not sufficiently resolved when each portion on the outer peripheral portion of the support pin, for example, a distance between both side portions is short, dark portions are overlapped, a shadow occurs in the diffuser plate shape, and the brightness of the display is partially decreased due to the shadow.

It is desirable to suppress an occurrence of uneven brightness on a display by suppressing an occurrence of a shadow on a diffuser plate.

According to an embodiment of the present technology, there is provided a display device which includes a display of which a display surface is displayed with an image; a plurality of light sources which output light toward the display, and configure a backlight; a diffuser plate which is arranged between the display and the plurality of light sources, and diffuses light which is output from the light source; and a support pin which is arranged on the opposite side to the display by interposing the diffuser plate therebetween, and holds the diffuser plate by being in contact with the diffuser plate, in which a plate shaped unit which is formed in a transparent plate shape is provided at a portion which is located on the diffuser plate side in the support pin, the plurality of light sources and the support pin are arranged in line in a direction which is orthogonal to a direction in which the display and the diffuser plate are aligned, and the plate shaped unit is caused to face the light source which is in the shortest distance.

Accordingly, in the display device, a dark portion which is formed when the outer peripheral portion of the support pin is projected is located by being separated in the diffuser plate.

In the display device, the support pin may be arranged between two of the light sources.

By arranging the support pin between the two light sources, both surfaces of the plate shaped unit of the support pin are caused to face the two light sources, respectively.

In the display device, the support pin may be arranged at the center portion between the two light sources.

By arranging the support pin at the center portion between the two light sources, a light amount which is input to both surfaces of the plate shaped unit becomes uniform.

In the display device, a tip end surface of the plate shaped unit may be formed in a convexly curved surface shape on the diffuser plate side in the width direction which is orthogonal to the thickness direction.

By forming the tip end surface of the plate shaped unit in the convexly curved surface shape on the diffuser plate side in the width direction which is orthogonal to the thickness direction, the tip end surface which is formed in the curved surface shape comes into contact with the diffuser plate when the support pin comes into contact with the diffuser plate.

In the display device, the tip end surface of the plate shaped unit may be formed in the convexly curved surface shape on the diffuser plate side in the thickness direction.

When the tip end surface of the plate shaped unit is formed in the convexly curved surface shape on the plate shaped unit side in the thickness direction, the tip end surface which is formed in the curved surface shape comes into contact with the diffuser plate when the support pin comes into contact with the diffuser plate.

In the display device, an attached unit which is attached to a predetermined member, and a connection unit which is located between the plate shaped unit and the attached unit are provided in the support pin, and the thickness of the connection unit may be set to be thicker than that of the plate shaped unit.

High rigidity of the support pin is secured by providing the attached unit which is attached to the predetermined member, and the connection unit which is located between the plate shaped unit and the attached unit in the support pin, and by setting the thickness of the connection unit to be thicker than that of the plate shaped unit.

The display device according to the present technology includes a display of which a display surface is displayed with an image; a plurality of light sources which output light toward the display, and configure a backlight; a diffuser plate which is arranged between the display and the plurality of light sources, and diffuses light which is output from the light source; and a support pin which is arranged on the opposite side to the display by interposing the diffuser plate therebetween, and holds the diffuser plate by being in contact with the diffuser plate, in which a plate shaped unit which is formed in a transparent plate shape is provided at a portion which is located at the diffuser plate side in the support pin, the plurality of light sources and the support pin are arranged in line in a direction which is orthogonal to a direction in which the display and the diffuser plate are aligned, and the plate shaped unit is caused to face the light source which is in the shortest distance.

Accordingly, it is possible to suppress an occurrence of uneven brightness on a display since a portion which is formed as a dark portion when the outer peripheral portion of the plate shaped unit is projected at the time of outputting of light from a light source is not overlapped, and a shadow does not occur in the diffuser plate.

In the technology according to the embodiment, the support pin is arranged between two of the light sources.

Accordingly, it is possible to suppress the generation of the uneven brightness on the display by preventing the occurrence of a shadow on the diffuser plate, to use a support pin of the necessary minimum size, and to reduce a manufacturing cost.

In the technology according to the embodiment, the support pin is arranged at the center portion between the two light sources.

Accordingly, a light amount which is input to both surfaces of the plate shaped unit becomes uniform, and it is possible to further suppress the occurrence of uneven brightness on the display.

In the technology according to the embodiment, the tip end surface of the plate shaped unit is formed in the convexly curved surface shape on the diffuser plate side in the width direction which is orthogonal to the thickness direction.

Accordingly, it is possible to prevent the diffuser plate from being damaged when the support pin comes into contact with the diffuser plate, and to secure a good diffusing function of the diffuser plate.

In the technology according to the embodiment, the tip end surface of the plate shaped unit is formed in the convexly curved surface shape on the diffuser plate side in the thickness direction.

Accordingly, it is possible to prevent the diffuser plate from being damaged when the support pin comes into contact with the diffuser plate, and to secure a better diffusing function of the diffuser plate.

In the technology according to the embodiment, the thickness of the connection unit is set to be thicker than that of the plate shaped unit by providing the attached unit which is attached to the predetermined member, and the connection unit which is located between the plate shaped unit and the attached unit in the support pin.

Accordingly, it is possible to secure the high rigidity of the support pin, and to maintain the diffuser plate in a stable state using the support pin.

DETAILED DESCRIPTION OF EMBODIMENTS

Hereinafter, embodiments of the display device according to the present technology will be described with reference to accompanying drawings.

In the embodiments which will be described later, the display device according to the present technology will be applied to a television receiver.

In addition, applications of the present technology are not limited to a television receiver, and, for example, can be widely applied to various display devices having a display unit such as a personal computer, a mobile terminal device, an electronic book, or the like.

Configuration of Display Device

Figure 1:
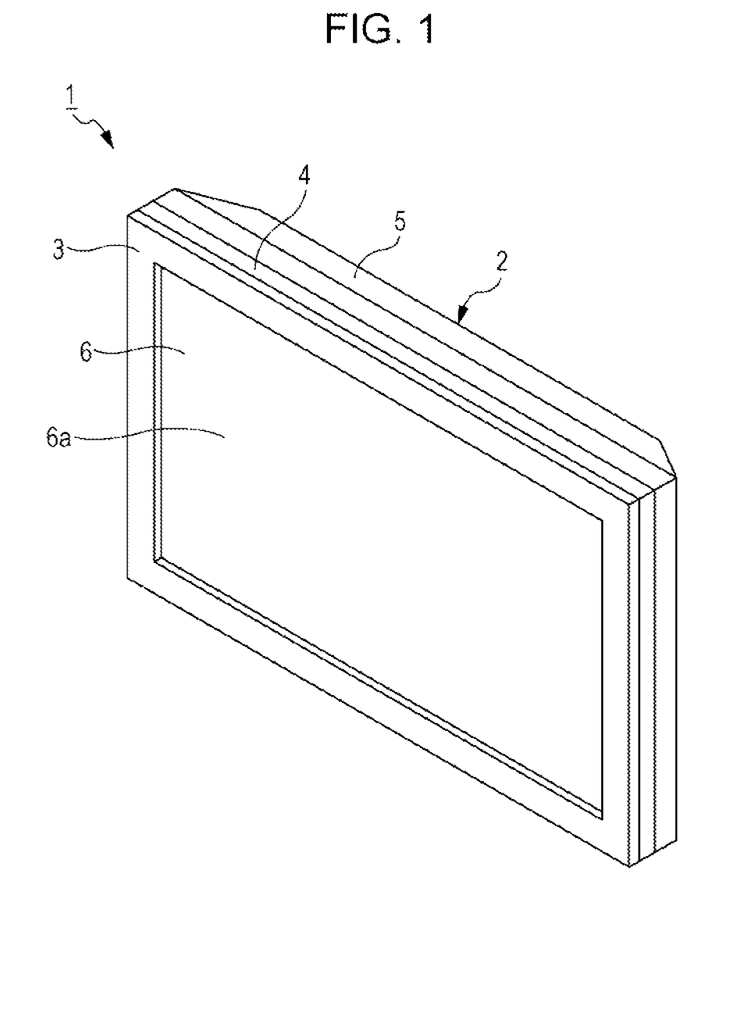
FIG. 1 illustrates a display device according to the present technology along with FIGS. 2 to 8, and the figure is a schematic perspective view of the display device.
Figure 2:
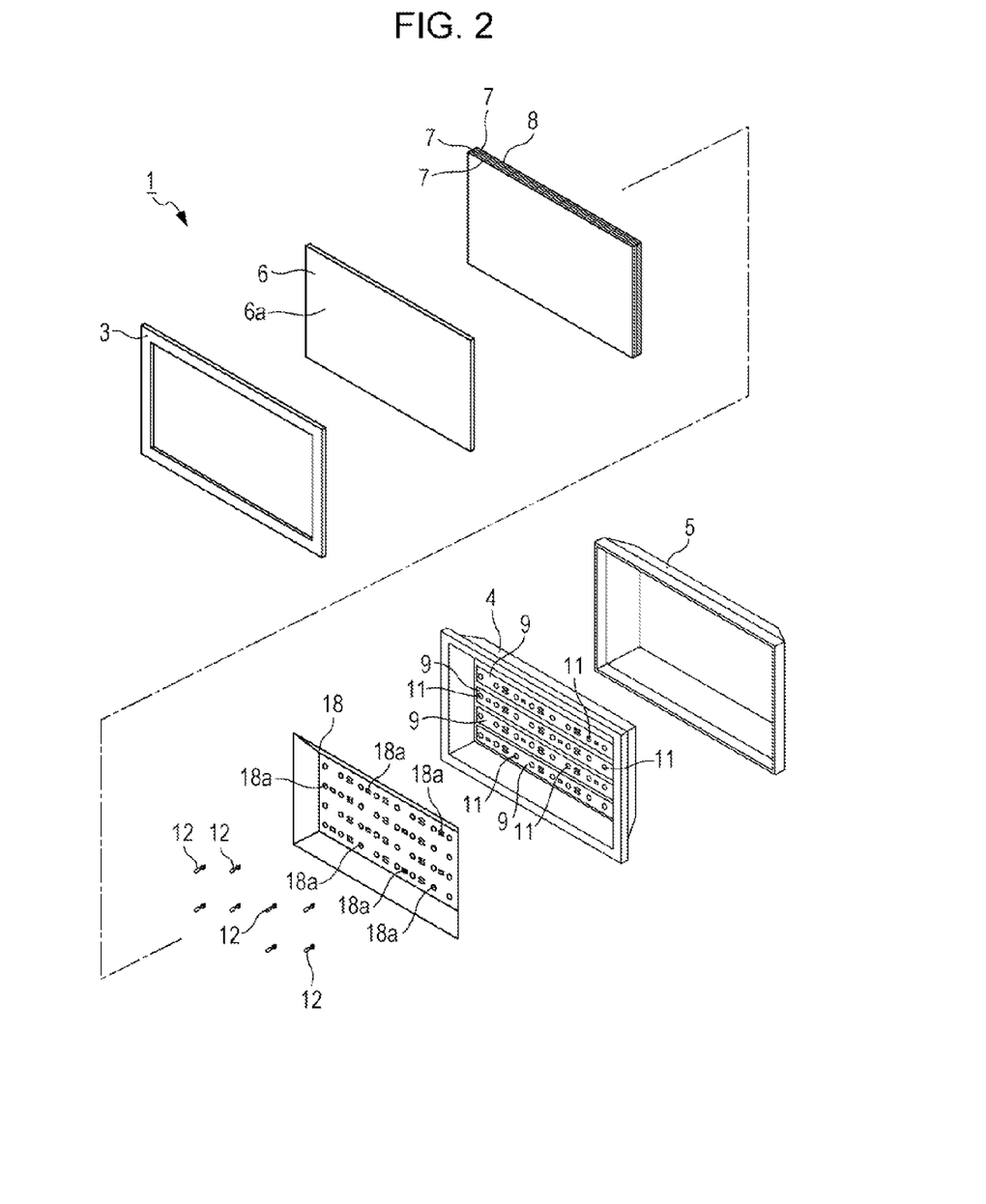
FIG. 2 is a schematic and exploded perspective view of the display device.
Figure 3:
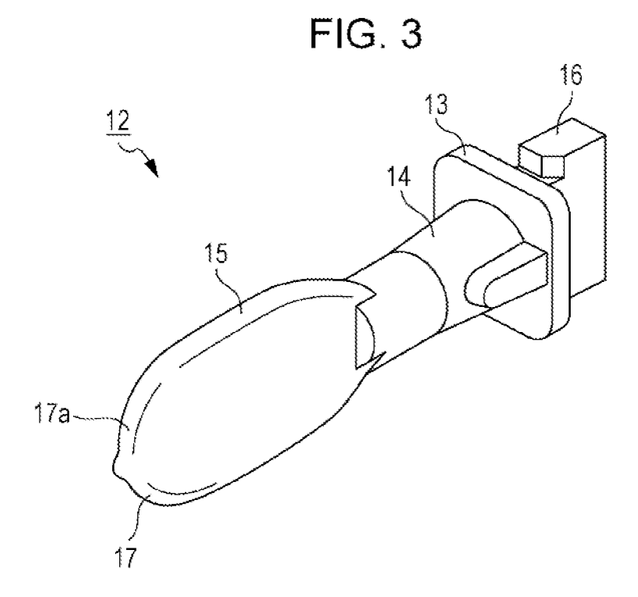
FIG. 3 is an enlarged perspective view of a support pin.

A display device (television receiver) 1 is formed, for example, in a horizontally long, flat, and substantially rectangular shape, and of which necessary each portion is arranged at a housing 2 (refer to FIGS. 1 and 2). The display device 1 is held by, for example, a stand which is not shown.

The housing 2 includes a bezel 3 which is located at the front side, and a back chassis 4 which is located on the rear side.

The bezel 3 is formed in a substantially rectangular frame shape.

The back chassis 4 is formed in a shallow box shape which is open to the front. A not shown control board is attached to the rear surface of the back chassis 4. The control board functions as a control circuit which supplies a current to a display which will be described later, supplies a driving current to a light source which will be described later, and controls the entire display device 1.

The back chassis 4 is attached with a rear cover 5 from the rear part. The rear cover 5 is formed in a shallow box shape which is open to the front, and the control board is blocked by the rear cover 5.

A display 6 is arranged on the inner peripheral side of the bezel 3. The display 6 is, for example, a liquid crystal panel which is formed by being laminated with a glass substrate, a polarizing sheet, or the like, and the front surface thereof is formed as a display surface 6a on which an image is displayed.

The display 6 is formed in a substantially rectangular shape, of which a portion excepting for the outer peripheral portion is provided as a display region on which an image is displayed, and the outer peripheral portion is held by the bezel 3. A not shown connection board is provided at the lower end portion of the display 6, and the connection board is connected to the control board which is attached to the rear surface of the back chassis 4.

Optical sheets 7, 7, . . . and a diffuser plate 8 are arranged in order from the front side at the rear side of the display 6. The optical sheets 7, 7, . . . are arranged, for example, in a state of being laminated on the front surface side of the diffuser plate 8.

The optical sheets 7, 7, . . . have each function of diffusing light, controlling of light in the moving direction, or the like, and it is possible to make uniform brightness on the display 6, to improve the brightness, or the like using the optical sheets 7, 7, . . . .

The diffuser plate 8 has a function of making the brightness on the display 6 uniform by diffusing light which is output from a light source.

Circuit boards 9, 9, . . . which are referred to as a light source are attached to the front surface of the back chassis 4, for example, by being vertically separated. In addition, a not shown attaching unit is provided at the back chassis 4, and it may be a configuration in which the circuit boards 9, 9, . . . are attached to the attaching unit.

The circuit boards 9, 9, . . . are formed in a horizontally long shape, and are connected to the control board which is attached to the rear surface of the back chassis 4.

Light sources 10, 10, . . . are mounted on the circuit board 9 by being horizontally separated from each other. As the light sources 10, 10, . . . , for example, a light emitting diode (LED) is used. The light sources 10, 10, . . . are covered with optical diffusing lenses 11, 11, . . . , respectively.

Support pins 12, 12, . . . are attached to the circuit board 9. The support pin 12 is formed of a transparent resin material such as, for example, polycarbonate, or the like. As a material of the support pin 12, it is preferable to use a material which has constant rigidity, and is not changed in color (yellowing) due to light or heat.

The support pin 12 is located at the center portion between the light sources 10 and 10 which are located by being horizontally separated from each other, and the light sources 10 and 10 are light sources 10 and 10 which are in the shortest distance from the support pin 12.

The tip ends of the support pins 12, 12, . . . can come into contact with the rear surface of the diffuser plate 8, and have a function of maintaining the diffuser plate 8 by suppressing deformation (bending) of the diffuser plate 8.

The support pin 12 is formed so as to be extended front and back, and has an attached unit 13, a connection unit 14, and a plate shaped unit 15 which are provided in order from the rear side (refer to FIGS. 3 to 6).

The attached unit 13 is formed in a plate shape which faces the front-back direction. An attached protrusion unit 16 which protrudes to the rear part is provided at the rear surface of the attached unit 13.

The connection unit 14 protrudes to the front part from the front surface of the attached unit 13, and is formed in a substantial pillar shape.

The plate shaped unit 15 is formed in a shape of which the width becomes small when a tip end portion 17 thereof goes toward the front part. The tip end portion 17 of the plate shaped unit 15 is formed in a convexly curved surface shape at the front part in the width direction to which a tip end surface 17a is orthogonal in the thickness direction (refer to FIG. 5).

Figure 5:
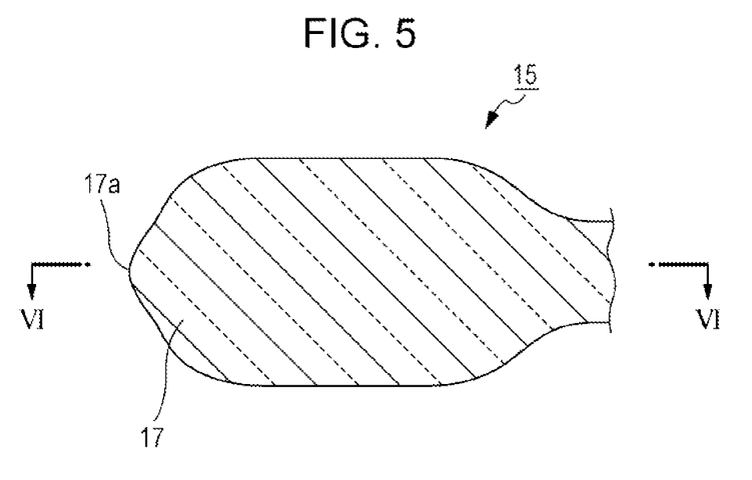
FIG. 5 is a cross-sectional view which is taken along line V-V in FIG. 4.

In this manner, since the tip end surface 17a of the plate shaped unit 15 is formed in the convexly curved surface shape at the front part in the width direction which is orthogonal to the thickness direction in the support pin 12, it is possible to prevent the diffuser plate 8 from being damaged when the support pin 12 comes into contact with the diffuser plate 8, and to secure a good diffusing function of the diffuser plate 8.

Figure 6:
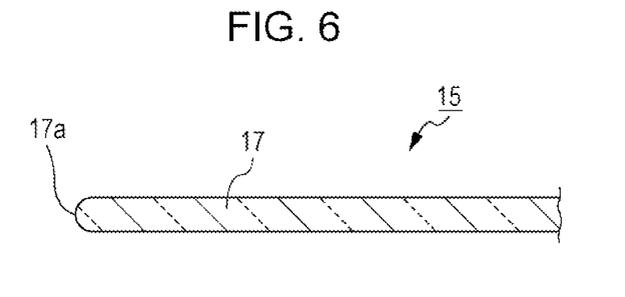
FIG. 6 is a cross-sectional view which is taken along line VI-VI in FIG. 5.

In addition, the tip end surface 17a of the tip end portion 17 is formed in the convexly curved surface shape at the front part in the thickness direction (refer to FIG. 6).

Accordingly, it is possible to prevent the diffuser plate 8 from being damaged when the support pins 12, 12, . . . come into contact with the diffuser plate 8, and to secure a better diffusing function of the diffuser plate 8.

In addition, in the support pin 12, the thickness of the connection unit 14 is set to be thicker than that of the plate shaped unit 15.

Accordingly, it is possible to secure high rigidity of the support pin 12, and to maintain the diffuser plate 8 in a stable state using the support pin 12.

In the support pin 12, the attached protrusion unit 16 is attached to the circuit board 9 by being inserted into a not shown attaching hole which is formed on the circuit board 9, and a tip end surface 17a is located by coming into close contact with, or being close to the rear surface of the diffuser plate 8.

Figure 4:
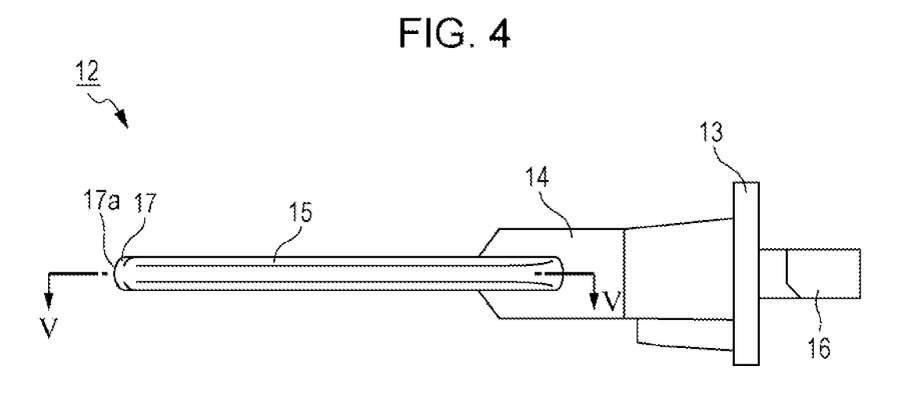
FIG. 4 is an enlarged plan view of the support pin.

The support pin 12 is attached to the circuit board 9 so that the thickness direction of the plate shaped unit 15 becomes the horizontal direction. Accordingly, the support pin 12 is set such that the plate shaped unit 15 faces the light sources 10 and 10 which are present on the right and left, and are in the shortest distance.

A reflecting sheet 18 is arranged on the front surface side of the back chassis 4. Arranging holes 18a, 18a, . . . are formed on the reflecting sheet 18 by being vertically and horizontally separated. In a state in which the reflecting sheet 18 is arranged on the front surface side of the back chassis 4, the light sources 10 and 10, and the support pins 12 and 12 are arranged by being inserted, respectively, in the arranging holes 18a and 18a, and the light sources 10, 10, . . . , and the support pins 12, 12, . . . are protruded to the front part from the front surface of the reflecting sheet 18.

Output of Light in Display Device

In the display device 1 which is configured as described above, when light is output from the light sources 10, 10, . . . , the light is diffused by the diffuser plate 8, and is input to the display 6 as backlight. At this time, part of light which is output from the light sources 10, 10, . . . is reflected by the reflecting sheet 18, and is input to the display 6 through the diffuser plate 8.

Figure 7:
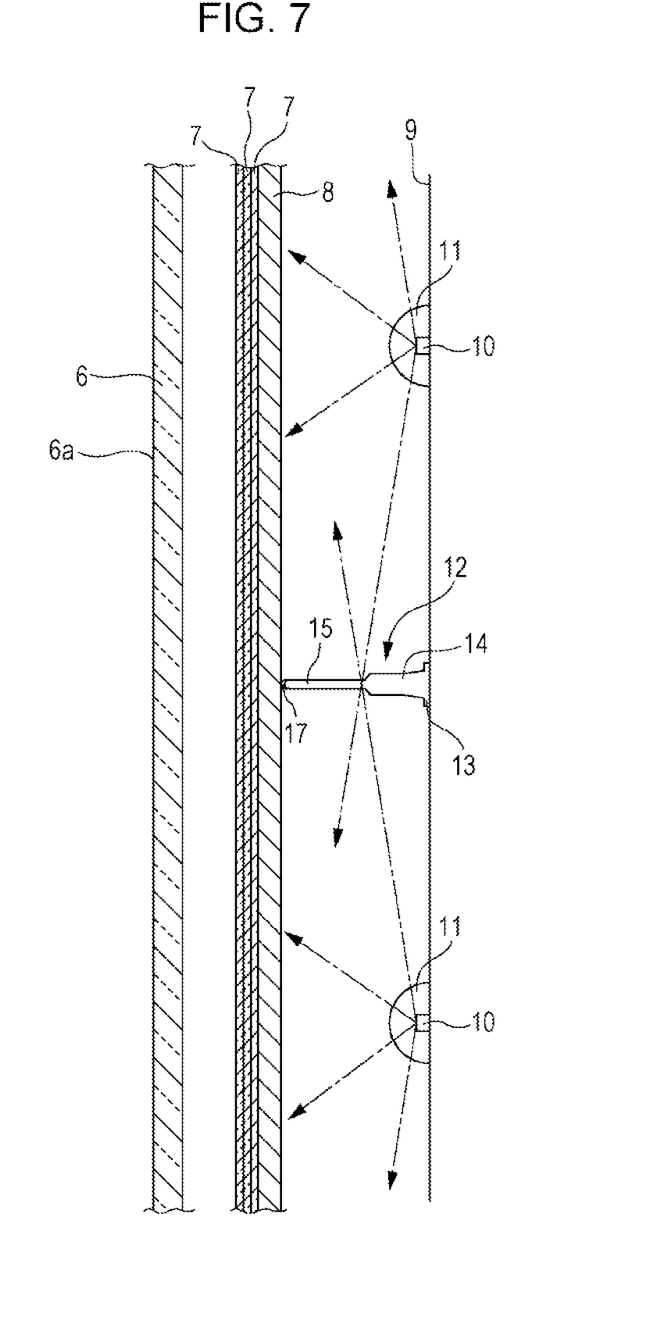
FIG. 7 is a conceptual diagram which illustrates an output state of light.

When light is output from the light sources 10, 10, . . . , part of light is input to the support pins 12, 12, . . . , and goes toward the display 6 through the diffuser plate 8 by transmitting the support pins 12, 12, . . . (refer to FIG. 7). In particular, since in the support pin 12, the plate shaped unit 15 is located at the front side of other portions, light which is output to the side from the light source 10 easily inputs to the plate shaped unit 15.

Figure 8:
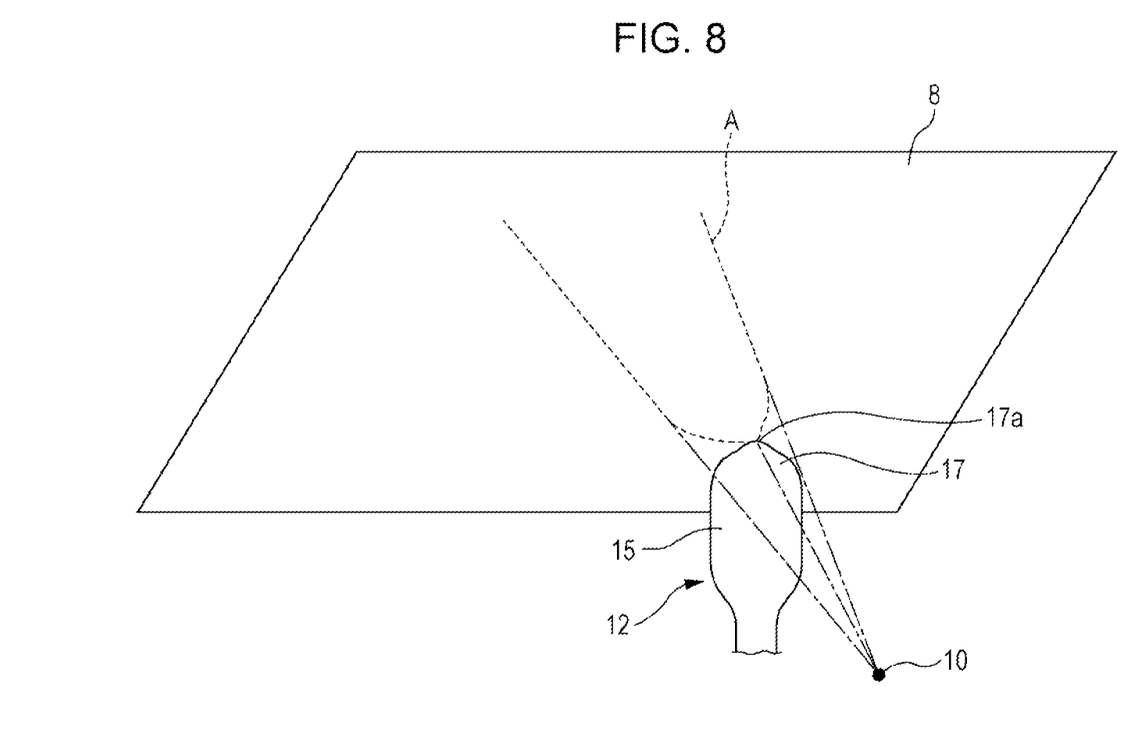
FIG. 8 is a schematic diagram which illustrates a state when light which is output from a light source is input to the support pin.

When light which is output from the light source 10 is input to the plate shaped unit 15 of the support pin 12, in the diffuser plate 8, a portion at which the outer peripheral portion of the plate shaped unit 15 is projected becomes a dark portion A at which brightness is slightly low compared to other portions (refer to FIG. 8).

However, in the display device 1, since the plate shaped unit 15 of the support pin 12 is widely formed in the width, the dark portions are located by being vertically and horizontally separated so as not to overlap with each other, and shadows do not occur in the diffuser plate 8.

Conclusion

As disclosed above, in the display device 1, the plate shaped unit 15 which is formed in a transparent plate shape is provided at a portion which is located on the diffuser plate 8 side in the support pin 12, the plurality of light sources 10, 10, . . . , and the support pins 12, 12, . . . are arranged in line in the direction which is orthogonal to the front-back direction, and the plate shaped unit 15 is caused to face the light source 10 which is in the shortest distance.

Accordingly, since the portion which is formed as the dark portion by being projected with the outer peripheral portion of the plate shaped unit 15 when light is output from the light source 10 is not overlapped, and a shadow does not occur in the diffuser plate 8, it is possible to suppress the occurrence of uneven brightness on the display 6.

In addition, in the display device 1, in a portion at the center side of the display 6, light which is output from the light sources 10, 10, . . . easily inputs from many directions compared to the outer peripheral portion of the display 6. Accordingly, in order to prevent the occurrence of shadows by inputting light to the support pins 12, 12, . . . from much more directions, it is preferable that the support pins 12, 12, . . . be arranged on the center side of the back chassis 4.

In addition, in the display device 1, the support pin 12 is arranged between the two light sources 10 and 10, and both surfaces of the plate shaped unit 15 (both surfaces in the thickness direction) of the support pin 12 are caused to face the two light sources 10 and 10, respectively.

Accordingly, it is possible to suppress the occurrence of the uneven brightness in the display 6 by preventing the occurrence of shadows in the diffuser plate 8, to use the support pin 12, 12, . . . of the necessary minimum size, and to reduce the manufacturing cost.

In addition, by arranging the support pin 12 at the center portion between the light sources 10 and 10, the light amount which is input to both surfaces of the plate shaped unit 15 becomes uniform, and it is possible to further suppress the occurrence of the uneven brightness on the display 6.

In addition, an example in which the whole of the support pins 12 is formed to be transparent has been described in the above description, however, in the support pin 12, at least the plate shaped unit 15 may be formed to be transparent, and other portions excepting for the plate shaped unit 15 may be formed to be non-transparent.

Present Technology

The present technology can also be configured as follows.

(1) A display device which includes a display of which a display surface is displayed with an image; a plurality of light sources which output light toward the display, and configure a backlight; a diffuser plate which is arranged between the display and the plurality of light sources, and diffuses light which is output from the light source; and support pins which are arranged on the opposite side to the display by interposing the diffuser plate therebetween, and maintain the diffuser plate by being in contact with the diffuser plate, in which a plate shaped unit which is formed in a transparent plate shape is provided at a portion which is located on the diffuser plate side in the support pin, the plurality of light sources and the support pin are arranged in line in a direction which is orthogonal to a direction in which the display and the diffuser plate are aligned, and the plate shaped unit is caused to face the light source which is in the shortest distance.

(2) The display device which is disclosed in (1), in which the support pin is arranged between two of the light sources.

(3) The display device which is disclosed in (2), in which the support pin is arranged at the center portion between the two light sources.

(4) The display device which is disclosed in any one of (1) to (3), in which a tip end surface of the plate shaped unit is formed in a convexly curved surface shape on the diffuser plate side in the width direction which is orthogonal to the thickness direction.

(5) The display device which is disclosed in any one of (1) to (4), in which the tip end surface of the plate shaped unit is formed in the convexly curved surface shape on the diffuser plate side in the thickness direction.

(6) The display device which is disclosed in any one of (1) to (5), in which an attached unit which is attached to a predetermined member, and a connection unit which is located between the plate shaped unit and the attached unit are provided in the support pin, and the thickness of the connection unit is set to be thicker than that of the plate shaped unit.

In the above described embodiments, any of the specific shape and structure of each unit is merely an example for embodying the present technology, and a technical range of the present technology should not be limited by these.

What is claimed is:

1. A display device comprising:
  a display of which a display surface is displayed with an image;
  a plurality of light sources which output light toward the display, and configure a backlight;
  a diffuser plate which is arranged between the display and the plurality of light sources, and diffuses light which is output from the light source; and
  a support pin which is arranged on the opposite side to the display by interposing the diffuser plate therebetween, and maintains the diffuser plate by being in contact with the diffuser plate,
  wherein a plate shaped unit which is formed in a transparent plate shape is provided at a portion which is located on the diffuser plate side in the support pin,
  wherein the plurality of light sources and the support pin are arranged in line in a direction which is orthogonal to a direction in which the display and the diffuser plate are aligned, and
  wherein the plate shaped unit is caused to face the light source which is in the shortest distance.

2. The display device according to claim 1,
  wherein the support pin is arranged between two of the light sources.

3. The display device according to claim 2,
  wherein the support pin is arranged at the center portion between the two light sources.

4. The display device according to claim 1,
  wherein a tip end surface of the plate shaped unit is formed in a convexly curved surface shape on the diffuser plate side in the width direction which is orthogonal to the thickness direction.

5. The display device according to claim 1,
  wherein the tip end surface of the plate shaped unit is formed in the convexly curved surface shape on the diffuser plate side in the thickness direction.

6. The display device according to claim 1,
wherein an attached unit which is attached to a predetermined member, and a connection unit which is located between the plate shaped unit and the attached unit are provided in the support pin, and
wherein the thickness of the connection unit is set to be thicker than that of the plate shaped unit.

\* \* \* \* \*